(12) United States Patent
Vignoles et al.

(10) Patent No.: US 7,373,659 B1
(45) Date of Patent: May 13, 2008

(54) SYSTEM, METHOD AND COMPUTER PROGRAM PRODUCT FOR APPLYING PRIORITIZED SECURITY POLICIES WITH PREDETERMINED LIMITATIONS

(75) Inventors: James M. Vignoles, Aylesbury (GB); Stephen Owen Hearnden, Milton Keynes (GB); Robert Hugh Smithson, Cheltenham (GB)

(73) Assignee: McAfee, Inc., Santa Clara, CA (US)

( * ) Notice: Subject to any disclaimer, the term of this patent is extended or adjusted under 35 U.S.C. 154(b) by 868 days.

(21) Appl. No.: 10/028,653

(22) Filed: Dec. 20, 2001

(51) Int. Cl.
*G06F 15/18* (2006.01)
*G06F 11/30* (2006.01)
*G08B 23/00* (2006.01)

(52) U.S. Cl. .................... 726/11; 726/1; 726/24
(58) Field of Classification Search ............... 713/201; 726/11, 1, 24
See application file for complete search history.

(56) References Cited

U.S. PATENT DOCUMENTS

| | | | | |
|---|---|---|---|---|
| 6,098,172 | A * | 8/2000 | Coss et al. ................. | 726/11 |
| 6,327,618 | B1 * | 12/2001 | Ahlstrom et al. ........... | 709/223 |
| 6,678,678 | B2 * | 1/2004 | Lee et al. ................... | 707/3 |
| 6,704,874 | B1 * | 3/2004 | Porras et al. ............... | 713/201 |
| 6,735,701 | B1 * | 5/2004 | Jacobson .................... | 726/1 |
| 6,910,028 | B2 * | 6/2005 | Chan et al. ................. | 706/47 |
| 6,985,746 | B2 * | 1/2006 | Gorsuch .................... | 455/456.3 |
| 7,010,807 | B1 * | 3/2006 | Yanovsky ................... | 726/24 |
| 2001/0014150 | A1 | 8/2001 | Beebe et al. ................ | 379/189 |
| 2003/0046421 | A1 * | 3/2003 | Horvitz et al. ............. | 709/238 |
| 2003/0110393 | A1 * | 6/2003 | Brock et al. ............... | 713/200 |

OTHER PUBLICATIONS

"ConSeal PC FIREWALL Technical Information", May 2, 1999, pp. 1-2. <http://web.archive.org/web/19990502202255/signal9.com/technical/prodsummary/fwsummary.html>.*
Toombs, Douglas, "ConSeal PC Firewall," Summer 1999, pp. 1-4. <http://www.windowsitpro.com/Articles/Print.cfm?ArticleID=5321>.*
Mien, Low Ee, "Defend your PC," 2000, pp. 1-7. <http://security.dso.org.sg/publications/fw-ids/Defend_Your_PC.htm>.*
Hari et al, "Detecting and resolving packet pilter conflicts", IEEE Mar. 26-30, 2000, pp. 1203-1212.*
Cisco, "IPSec User Guide for the Cisco Secure PIX Firewall Version 5.2," Sep. 2000, pp. 6-1 to 6-4.*

* cited by examiner

*Primary Examiner*—Emmanuel L. Moise
*Assistant Examiner*—Michael Pyzocha
(74) *Attorney, Agent, or Firm*—Zilka-Kotab, PC; Christopher J. Hamaty

(57) ABSTRACT

A system, method and computer program product are provided for prioritized network security. Initially, a set of policies is identified, where each policy has a condition associated therewith. It is then determined whether the conditions are met. Next, the policies are activated whose associated conditions are determined to be met. Such conditions represent a priority of the policy.

21 Claims, 8 Drawing Sheets

SYSTEM, METHOD AND COMPUTER PROGRAM PRODUCT FOR APPLYING PRIORITIZED SECURITY POLICIES WITH PREDETERMINED LIMITATIONS

FIELD OF THE INVENTION

The present invention relates to network security management, and more particularly to policy-based security scanning.

BACKGROUND OF THE INVENTION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is on-going, ever changing, and an increasingly complex problem.

Computer network attacks can take many forms and any one attack may include many security events of different types. Security events are anomalous network conditions each of which may cause an anti-security effect to a computer network, Security events include stealing conventional or private information; producing network damage through mechanisms such as viruses, worms, or Trojan horses; overwhelming the network's capacities in order to cause denial of services, and so forth.

Network security-risk-assessment tools, i.e. "scanners," may be used by a network manager to simulate an attack against computer systems via a remote connection. Such scanners can probe for network weaknesses by simulating certain types of security events that make up an attack. Such tools can also test user passwords for suitability and security. Moreover, scanners can search for known types of security events in the form of malicious programs such as viruses, worms, and Trojan horses.

During the course of scanning, a scanner may implement various policies in response to a security event or the threat of a security event. Such policies may include blocking predetermined files, blocking e-mail messages exhibiting certain criteria, changing passwords, and/or any other reaction to a known security event. In conventional network security systems, such policies are often maintained until the security event or threat no longer applies. Prior Art FIG. 1 illustrates the manner in which at least one policy 10 is maintained until the security event is non-existent.

By following such simplistic approach to triggering policies and policies in general, various problems may arise. For example, if separate security events trigger different policies that conflict, there is currently no way of dealing with such conflict. Other problems include the fact that policies associated with a serious "high-risk" security event may be disabled after the security event is terminated. In such situations, it may be more suitable to maintain such defensive policies for a period that is not necessarily a function of the immediate presence of the security event.

DISCLOSURE OF THE INVENTION

A system, method and computer program product are provided for prioritized network security. Initially, a set of policies is identified, where each policy has a condition associated therewith. It is then determined whether the conditions are met. Next, the policies are activated whose associated conditions are determined to be met. Such conditions represent a priority of the policy.

In one embodiment, it is determined whether a user confirms the activation of the policies. Further, the policies may be activated if the user confirms.

In another embodiment, the set of policies may be updated. Such updating may include receiving another inactive policy, and determining whether the user accepts the inactive policy. If the user accepts the inactive policy, the inactive policy may be added to the set for being activated if the associated condition is met.

In still another embodiment, the activation of the policies may include adding the policies to a set of active policies. Security actions associated with the active policies may then be executed if associated limits are met.

As an option, it may be determined whether the conditions associated with the active policies are still met. As such, the active policies may be deactivated if the associated conditions are not met.

In still yet another embodiment, execution of the security action may include identifying currently executed security actions, determining whether a conflict exists between the currently executed security actions, and resolving any conflicts between the currently executed security actions.

In various embodiments, the conditions may include, but are not limited to a time factor, a source of the policies, a severity of security actions associated with the policies, etc.

BRIEF DESCRIPTION OF THE DRAWINGS

Prior Art

DESCRIPTION OF THE PREFERRED EMBODIMENTS

Figure 1:
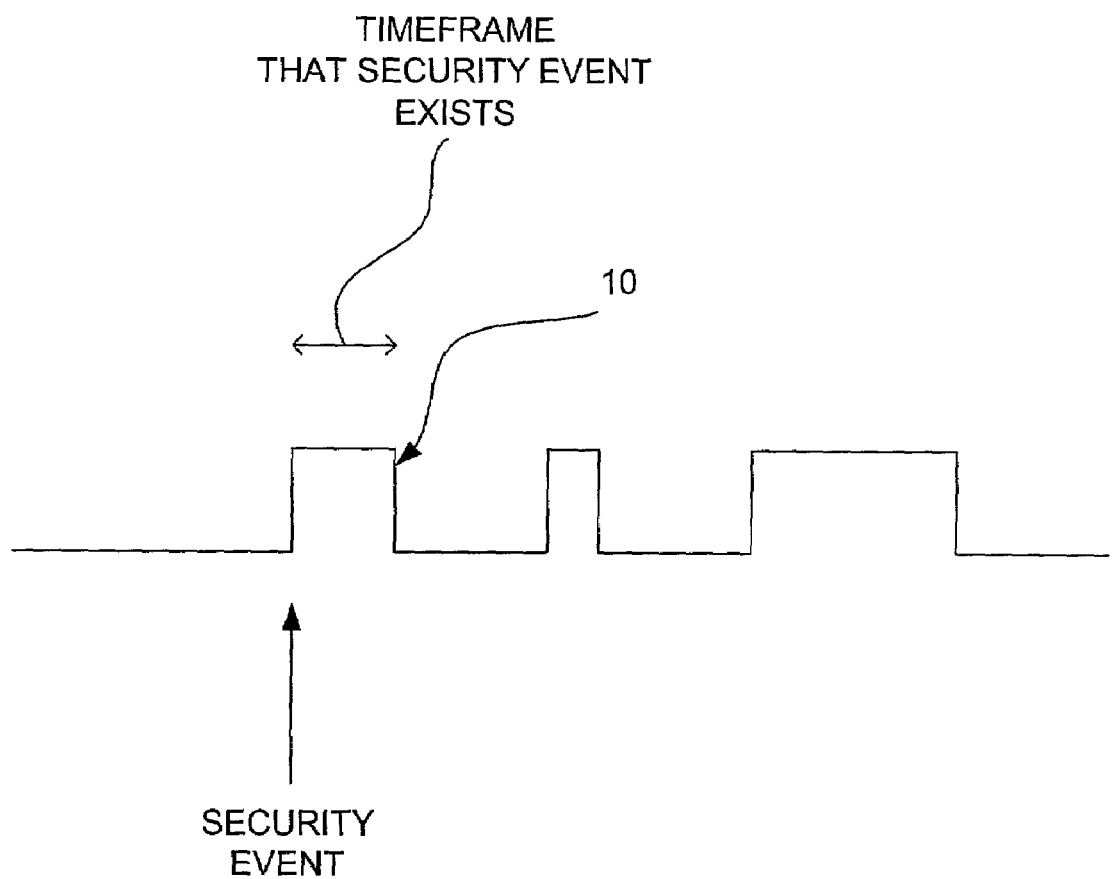
FIG. 1 illustrates the manner in which a policy is maintained until a security event is non-existent, in accordance with the prior art.
Figure 1A:
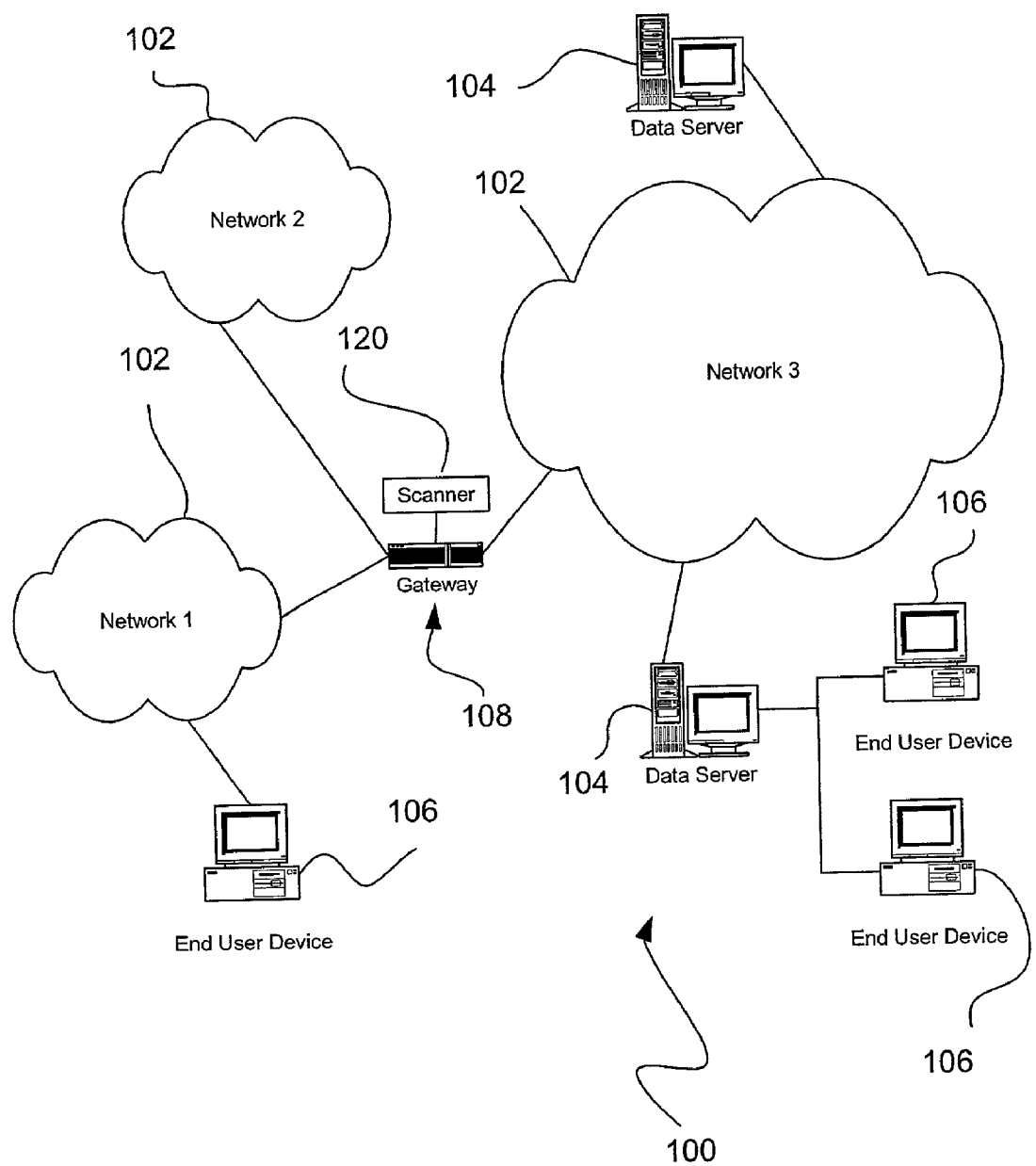
FIG. 1A illustrates a network architecture, in accordance with one embodiment.

FIG. 1A illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data servers 104 which are capable of communicating over the networks 102. Also coupled to the networks 102 and the data servers 104 is a plurality of end user computers 106. In the context of the present description, such end user computers 106 may include a web server, desktop computer, lap-top computer, hand-held computer, printer or any other type of hardware/software.

In order to facilitate communication among the networks 102, at least one gateway 108 is coupled therebetween. It should be noted that each of the foregoing network devices as well as any other unillustrated devices may be interconencted by way of a plurality of network segments. In the context of the present description, a network segment includes any portion of any particular network capable of connecting different portions and/or components of a network.

While shown attached to the gateway 108, any of the foregoing components and/or segments may be equipped with a scanner 120 including anti-virus scanning software. Such scanner 120 may be equipped to probe for network weaknesses by simulating certain types of security events that make up an attack. Such scanner 120 may also test user passwords for suitability and security. Moreover, the scanner 120 may also search for known types of security events in the form of malicious programs such as viruses, worms, and Trojan horses. Still yet, the scanner 120 may be adapted for content filtering to enforce an organization's operational policiesd [i.e. detecting harassing or pornographic content, junk e-mails, misinformation (virus hoaxes), etc.]. Of course, the scanner 120 may take any other sort of security measures.

The scanner 120 operates in the foregoing manner in accordance with policies. In the context of the present description, a policy may include any setting, rule, command, software, instruction or any other type of indication as to how the scanner 120 or group of scanners 120 should operate.

In use, the scanner 120 is capable of prioritized network security. Initially, a set of policies is identified, where each policy has a condition associated therewith. It is then determined whether the conditions are met. Next, the policies are activated whose associated conditions are determined to be met. Such conditions represent a priority of the policy. In the context of the present description, a priority of the policy may be dictated by an associated severity, importance, urgency, source of the policy, a time limit, or any other desired factor relating to system security.

By having policies of varying priority, the scanner 120 can be dynamically configured to handle security situations in a more versatile manner. One exemplary application of the foregoing technique will be set forth hereinafter in greater detail.

Figure 2:
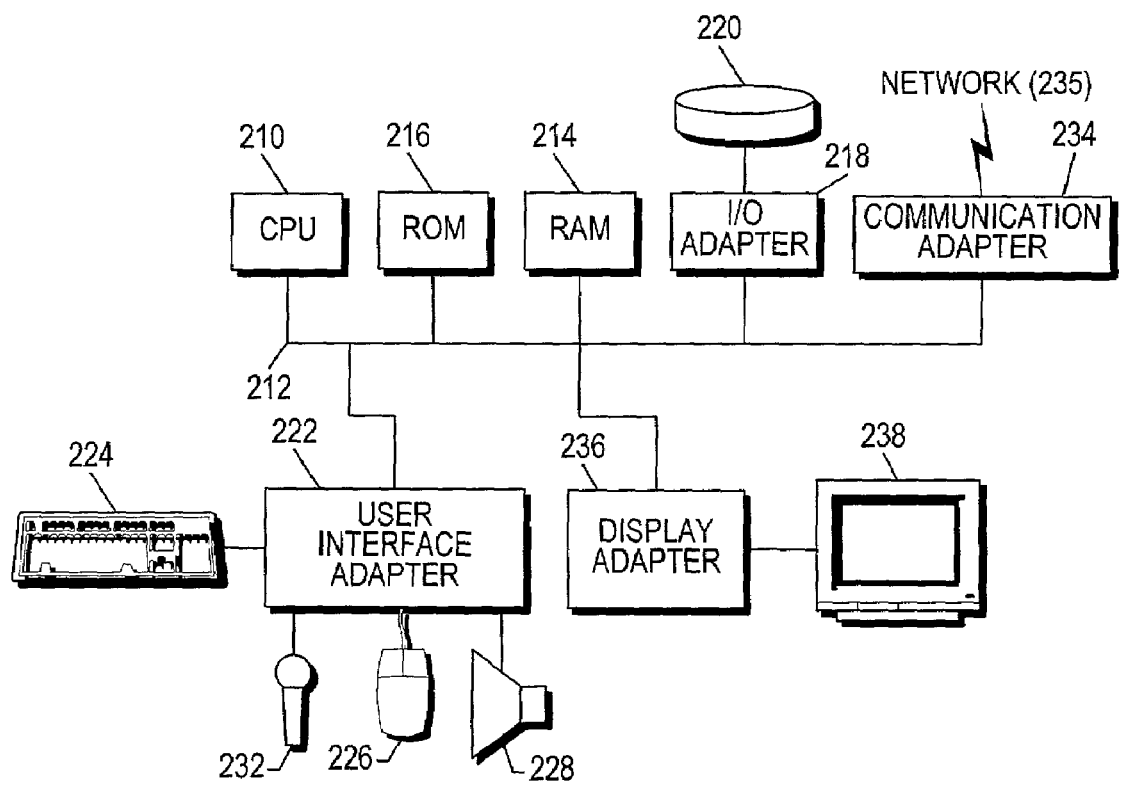
FIG. 2 shows a representative hardware environment that may be associated with the data servers and computers of FIG. 1A, in accordance with one embodiment.

FIG. 2 shows a representative hardware environment that may be associated with the data servers 104 and/or end user computers 106 of FIG. 1A, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
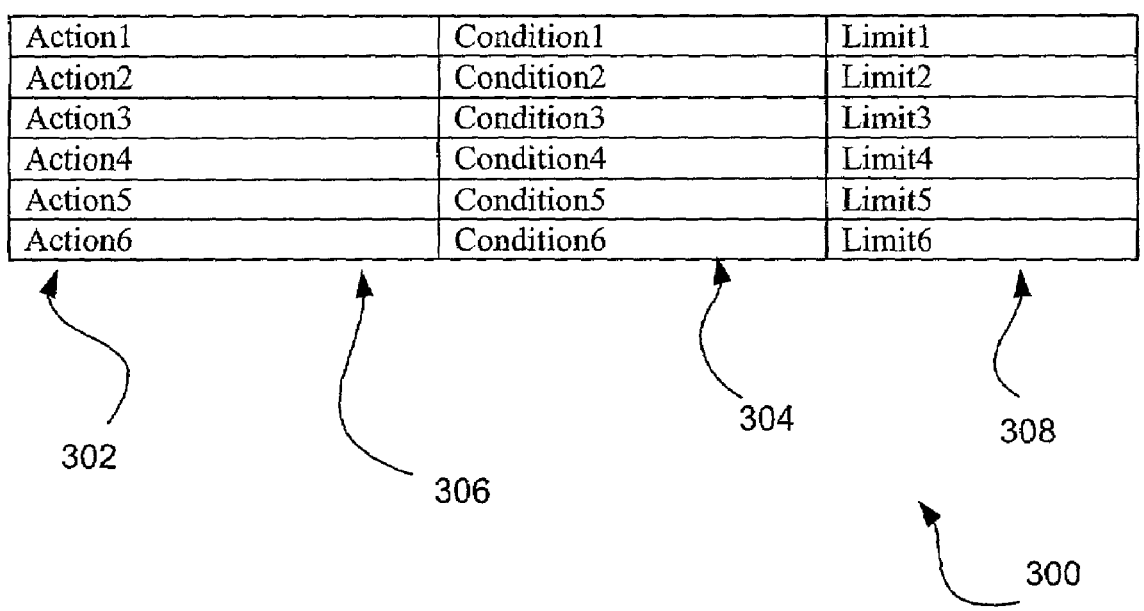
FIG. 3 illustrates an exemplary policy set that may be used by a scanner, in accordance with one embodiment.

FIG. 3 illustrates an exemplary policy set 300 that may be used by a scanner, in accordance with one embodiment. As shown, each policy 302 of the policy set 300 is prioritized in a predetermined order. As mentioned earlier, such prioritization may be dictated by an associated severity, importance, source of the policy, a time limit, or any other desired factor relating to system security.

Each policy 302 of the policy set 300 further includes a condition 304 for activating the policy 302. Such conditions 304 may include any factor, parameter or function that determines whether the policy 302 should be activated and even deactivated. Just by way of example, such condition 304 may be based on a predetermined timeframe, whether a virus signature (.DAT) update is current, a source of the related policy, the detection of a predetermined amount of files of a certain type, or any other desired condition. Of course, the activation conditions 304 ay be different from a deactivation condition 304 (e.g., activation is dependent on a number of identical files, but deactivation may be the successful updating of the DATs). Again, the conditions 304 reflects a priority of the policy. Thus, higher priority policies 302 have conditions 304 that differ from lower priority policies 302.

Further associated with each policy 302 of the policy set 300 are one or more security actions 306. Each security action 306 may include any type of action adapted to remedy or react to a security event. Associated therewith is a limit 308 which may include any triggering event, parameter, or the like capable of triggering the security action 306 if the policy 302 is active.

In other words, no security action 306 can be initiated when the associated policy 302 is inactive. Only when the condition 304 is met can the policy 302 be activated. Further, when the policy 302 is active, the security action 306 can be initiated only upon the limit 308 being met. More information relating to the relation between the above parameters will be set forth in a specific example hereinbelow.

Figures 4, 4A:
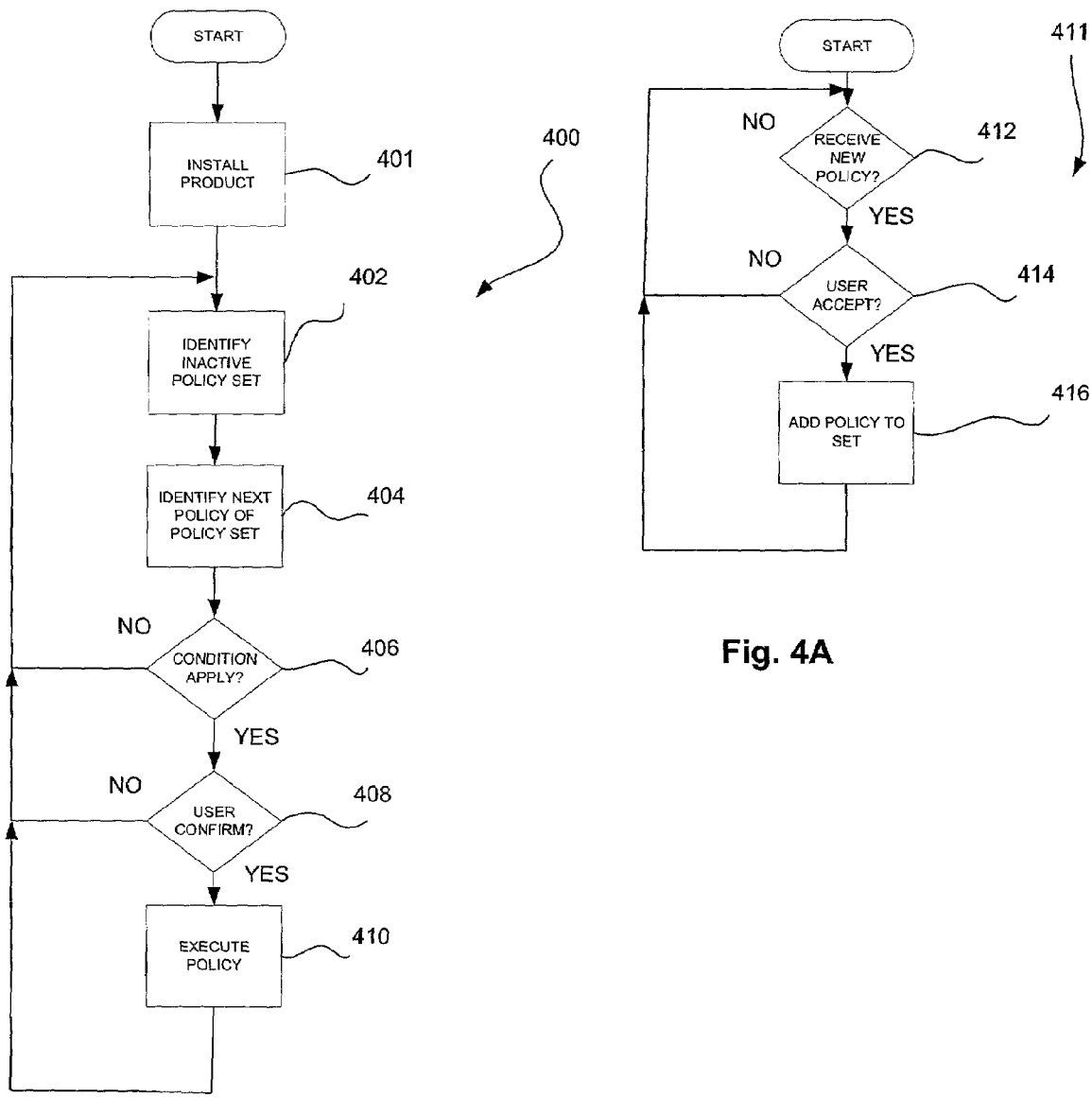
FIG. 4 illustrates a method for prioritized network security, in accordance with one embodiment.
FIG. 4A illustrates an exemplary method for updating the inactive policy set, in accordance with one embodiment.

FIG. 4 illustrates a method 400 for prioritized network security. In one embodiment, the present method 400 may be used in the context of a scanner like that mentioned hereinabove during reference to FIG. 1A. Of course, the present techniques may be utilized in any desired context.

Initially, a scanner product is installed with a plurality of policies associated therewith. See operation 401. One exemplary set of policies is shown in FIG. 3. Of course, any desired set may be utilized per the desires of the user. Further, the set of policies may be constantly updated. One exemplary update process will be set forth in greater detail during reference to FIG. 4A.

Once installed, such policies are identified in operation 402. It should be noted that before the policies are installed, they are considered to be inactive. Further, the policies are considered to be inactive until the associated condition has been met.

Next, one of the inactive policies (i.e. a first one of the inactive policies) is identified from the set in operation 404. As will soon become apparent, each inactive policy is monitored during the present method 400 to determine whether it should be activated.

It is then determined in operation 406 as to whether the condition associated with the present inactive policy applies or, in other words, is "met." Again, such condition may include any factor, parameter or function that determines whether the policy should be activated. For example, such condition may be based on a predetermined timeframe, whether a virus signature (.DAT) update is current, a source of the related policy, the detection of a predetermined amount of files, or any other desired condition.

Since the different conditions reflect a priority of the inactive policy, some of the inactive policies may be activated immediately when the scanner product is installed, while others may only be activated upon a heightened security condition. An example of these varying conditions and priorities will be set forth in detail in the form of an example during reference to FIG. 7.

As an option, if the condition is met in decision 406, it may be determined whether a user confirms the activation of the inactive policy in decision 408. It should be noted that, in one embodiment, no user interaction is required, and the various principles set forth herein are carried out automatically.

If both the condition is met and the user confirms, the inactive policy may be activated in operation 410. Once activated, the inactive policy is added to a set of active policies. The manner in which such active set of policies is handled will be set forth in greater detail during reference to FIG. 5.

FIG. 4A illustrates an exemplary method 411 for updating the inactive policy set, in accordance with one embodiment. As shown, it is first determined whether another inactive policy is received in decision 412. Such additional policy may be received from a trusted source via a network or the like. Similar to before, it is then determined whether the user accepts the inactive policy in decision 414. If the user accepts the inactive policy, such inactive policy is added to the set and is monitored in the context of the method 400 of FIG. 4.

Figure 5:
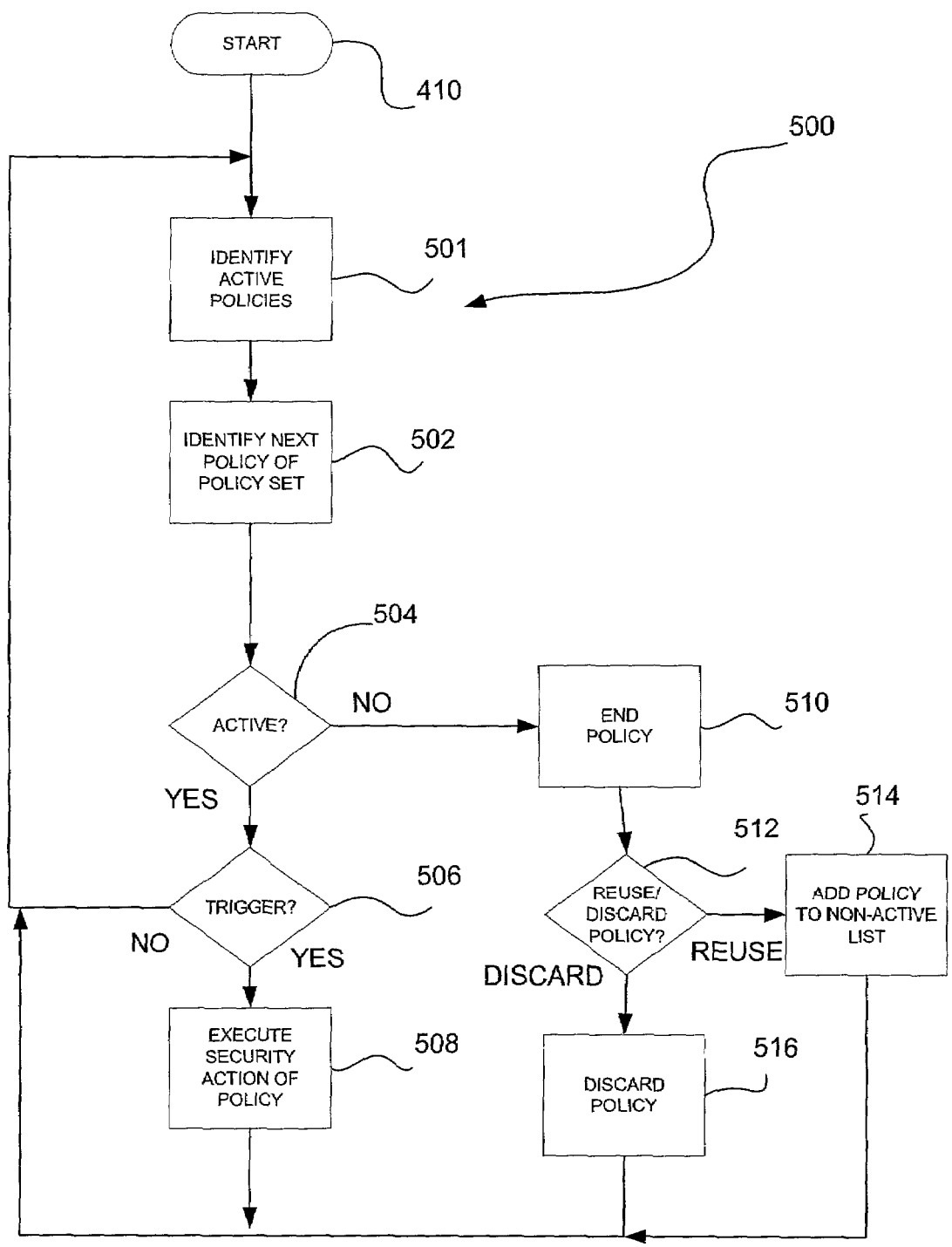
FIG. 5 illustrates a method for executing active policies, in accordance with operation 410 of FIG. 4.

FIG. 5 illustrates a method 500 for executing active policies, in accordance with operation 410 of FIG. 4. It should be noted that the active policies in the active policy set are received by adding the inactive policies thereto, as set forth in the method 400 of FIG. 4.

As shown in FIG. 5, the set of active policies is initially identified in operation 501. Thereafter, one of the active policies (i.e. a first one of the active policies) is identified from the set in operation 502. As will soon become apparent, each active policy is monitored during the present method 500 to determine whether they should be triggered.

It is then determined whether the current active policy is still active in decision 504. For example, it may be determined whether the conditions associated with the active policies are still met. It should be noted that the condition associated with the current active policy may also dictate the manner in which the active policy is to be deactivated. Again, such condition may include any factor, parameter or function that determines whether the policy should be deactivated.

If it is determined that the active policy is still active in decision 504, it is then determined in decision 506 as to whether the limit has been met. Note again that the limit may include any triggering event, parameter, or the like capable of triggering the security action if the policy is active. If so, the security action associated with the policy is executed. See operation 508.

As will soon become apparent, various security actions of different policies may conflict in various ways. Just by way of example, one security action may require a device shut down, while another requires a comprehensive scan. More information regarding the manner in which the security actions of the policies are executed will be set forth in greater detail during reference to FIG. 6.

If, on the other hand, it is determined that the active policy is no longer active in decision 504, the policy is deactivated in operation 510. It is then determined in decision 512 as to whether the policy is to be reused or discarded in decision 512. An indication of such may be stored with the policy, condition, etc. Of course, this may be dictated by the user or in any other desired manner.

If it is decided that the deactivated policy may be reused, it may again be added to the inactive policy set for being handled by the method 400 of FIG. 4. Note operation 514. If not, it may be simply discarded in accordance with operation 516.

Figure 6:
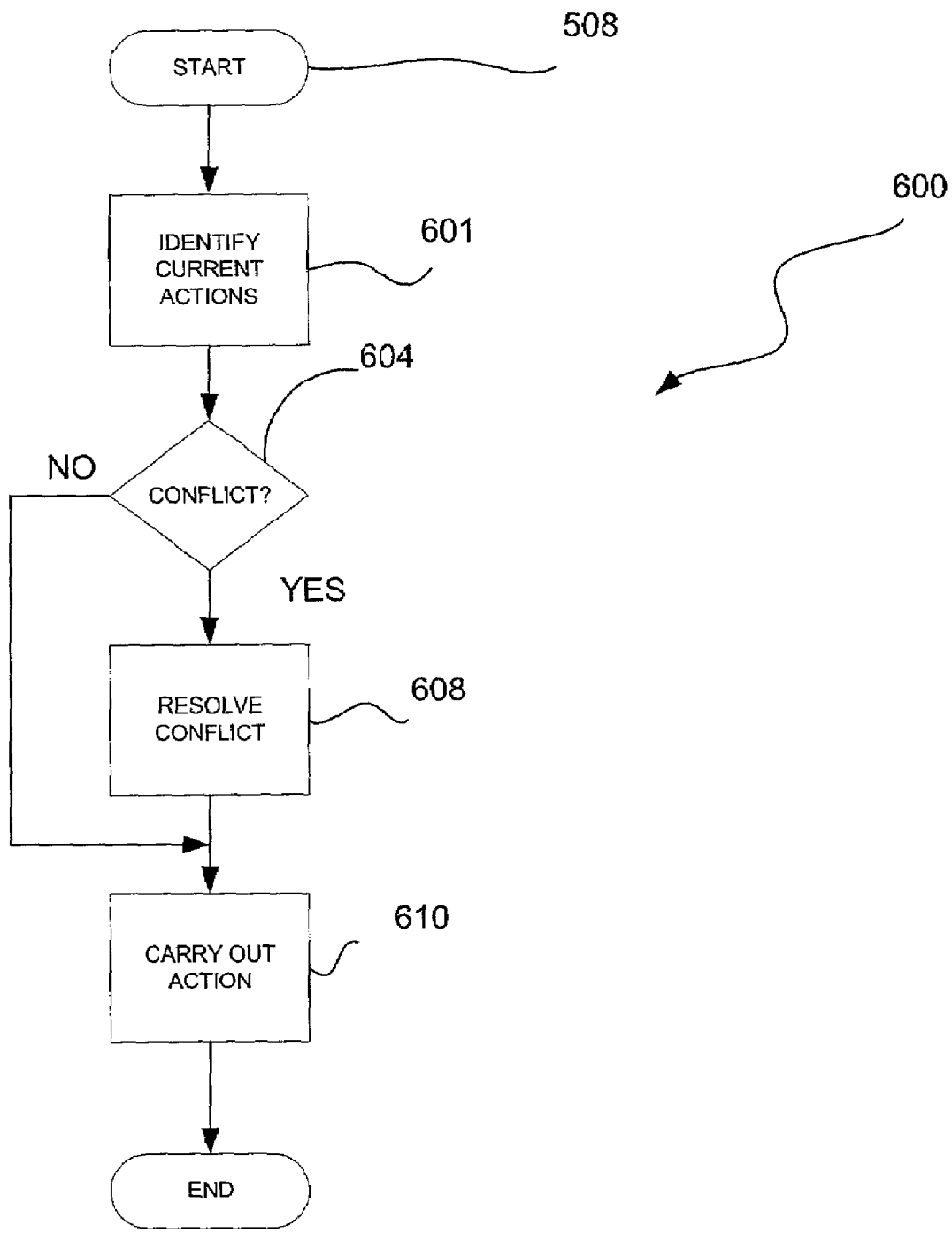
FIG. 6 illustrates a method for executing security actions associated with policies, in accordance with operation 508 of FIG. 5.

FIG. 6 illustrates a method 600 for executing security actions associated with the policies, in accordance with operation 508 of FIG. 5. As shown, all currently executed security actions are first identified in operation 601. Thereafter, it is determined in decision 604 whether a conflict exists between the executed security actions. For example, one security action may require a device shut down, while another requires a comprehensive scan. Further, conflicts may be due to exclusively mutual actions or due to authorization conflict, i.e. a manual action needing a user to confirm vs. an automatic action. Of course, any type of conflict between the executed security events may trigger the present decision 604.

If a conflict is found, the conflict may be resolved. See operation 608. This may be accomplished in any desired manner. For example, such conflict may be resolved based on a priority of the policies associated with the security actions at issue. In particular, a security action associated with a higher priority policy may be selected in lieu of the other security action. Once resolved, the appropriate security action(s) may be executed in operation 610.

Figure 7:
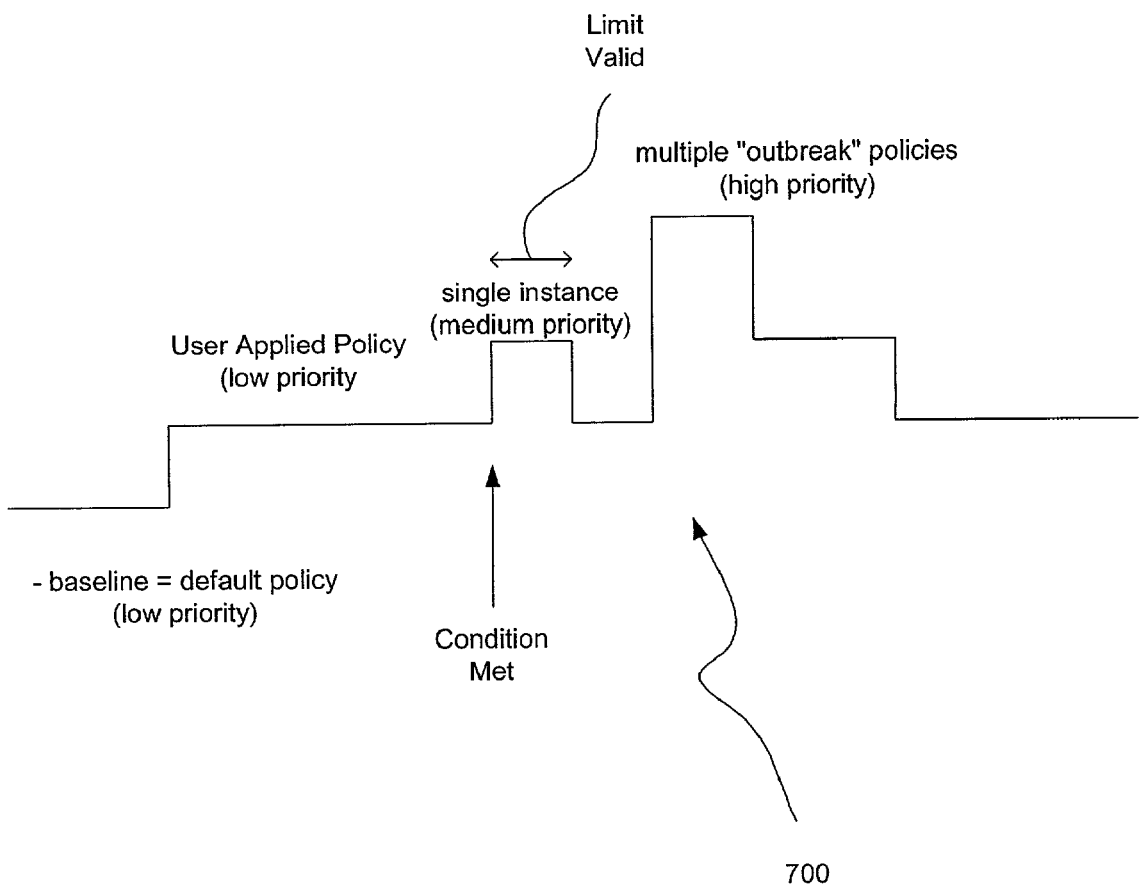
FIG. 7 illustrates an example of operation of the present embodiment.

FIG. 7 illustrates an example of operation 700 of the present embodiment. As shown, low priority policies may each act as a default policy which does not expire. This may include a default configuration of an "out-of-the-box" product, or specified by an administrator.

Medium priority policies may be valid for a predetermined time period (i.e. less than a month) and block a specific subject line. Further, medium priority policies may be sent by an administrator. Still yet, high priority policies may be valid for less than a week, block all attachments, and also be sent by an administrator. It should be noted that the present embodiment may be controlled locally or using a multi-tiered distributed approach.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method executed utilizing a computer including a tangible computer readable medium for prioritized network security, comprising:
   identifying a set of policies, each policy having a condition associated therewith;
   determining whether the conditions are met;
   determining whether a user confirms activation of the policies; and
   activating the policies whose associated conditions are determined to be met if the user confirms the activation;
   wherein the conditions are based on a priority of the policy;
   wherein a first policy with a higher priority has a first condition associated therewith that is different from a second condition associated with a second policy with a lower priority such that the first policy and second policy are activated under different priority-related conditions;
   wherein the activation of the policies includes:
      adding the policies to a set of a plurality of active policies, and executing securing actions associated with the active policies if associated limits are met; and
      identifying currently executed security actions, determining whether a conflict exists between the currently executed security actions, and resolving any conflicts between the currently executed security actions;
   wherein the conditions are based on a time factor, the time factor including at least one of a timeframe, a predetermined time period, and a time limit;
   wherein the conditions are based on a source of the policies;
   wherein the conditions are based on a severity of security actions associated with the policies.

2. The method as recited in claim 1, and further comprising updating the set of policies.

3. The method as recited in claim 2, wherein the updating includes receiving another inactive policy, determining whether the user accepts the inactive policy, and adding the inactive policy to the set if the user accepts the inactive policy.

4. The method as recited in claim 1, and further comprising determining whether the conditions associated with the active policies are still met, and de-activating the active policies if the associated conditions are not met.

5. The method as recited in claim 1, wherein the policies include low priority policies that are default policies which do not expire.

6. The method as recited in claim 1, wherein the policies include medium priority policies that are valid for the predetermined time period.

7. The method as recited in claim 6, wherein the policies include high priority policies that are valid for another predetermined time period that is less than the predetermined time period associated with the medium priority policies.

8. The method as recited in claim 1, wherein the identifying the set of policies, the determining whether the conditions are met, and the activating the policies are controlled locally.

9. The method as recited in claim 1, wherein the associated conditions of the policies dictate the manner in which the active policies are to be deactivated.

10. The method as recited in claim 1, and further comprising determining whether one of the active policies is still active including determining whether the condition associated with the active policy is still met.

11. The method as recited in claim 10, and further comprising de-activating the active policy if the associated condition is not met and determining whether the de-activated policy is to be reused or discarded.

12. The method as recited in claim 11, wherein an indication of the determination whether the de-activated policy is to be reused or discarded is stored with the associated condition.

13. The method as recited in claim 1, wherein the condition are based on the detection of a predetermined amount of files of a certain type.

14. The method as recited in claim 1, wherein the conditions are based on whether a virus signature update is current.

15. A computer program product embodied on a tangible computer readable medium for prioritized network security, comprising:
   computer code for identifying a set of policies, each policy having a condition associated therewith;
   computer code for determining whether the conditions are met;
   computer code for determining whether a user confirms activation of the policies; and
   computer code for activating the policies whose associated conditions are determined to be met if the user confirms the activation;
   wherein the conditions are based on a priority of the policy;
   wherein a first policy with a higher priority has a first condition associated therewith that is different from a second condition associated with a second policy with a lower priority such that the first policy and second policy are activated under different priority-related conditions;
   wherein the activation of the policies involves:
      computer code for adding the policies to a set of a plurality of active policies, and executing security actions associated with the active policies if associated limits are met; and
      computer code for identifying currently executed security actions, determining whether a conflict exists between the currently executed security actions, and resolving any conflicts between the currently executed security actions;
   wherein the conditions are based on a time factor, the time factor including at least one of a timeframe, a predetermined time period, and a time limit;
   wherein the conditions are based on a source of the policies;
   wherein the conditions are based on a severity of security actions associated with the policies.

16. The computer program product as recited in claim 15, and further comprising computer code for updating the set of policies.

17. The computer program product as recited in claim 16, wherein the updating includes receiving another inactive policy, determining whether the user accepts the inactive policy, and adding the inactive policy to the set if the user accepts the inactive policy.

18. The computer program product as recited in claim 15, and further comprising computer code for determining whether the conditions associated with the active policies are still met, and de-activating the active policies if the associated conditions are not met.

19. A system including a computer with a tangible computer readable medium for prioritized network security, the medium comprising:

logic for identifying a set of policies, each policy having a condition associated therewith;

logic for determining whether a user confirms activation of the policies;

logic for determining whether the conditions are met if the user confirms the activation; and logic for activating the policies whose associated conditions are determined to be met;

wherein the conditions are based on a priority of the policy;

wherein a first policy with a higher priority has a first condition associated therewith that is different from a second condition associated with a second policy with a lower priority such that the first policy and second policy are activated under different priority-related conditions;

wherein the activation of the policies involves:

logic for adding the policies to a set of a plurality of active policies, and executing security actions associated with the active policies if associated limits are met; and logic for identifying currently executed security actions, determining whether a conflict exists between the currently executed security actions, and resolving any conflicts between the currently executed security actions;

wherein the conditions are based on a time factor, the time factor including at least one of a timeframe, a predetermined time period, and a time limit;

wherein the conditions are based on a source of the policies;

wherein the conditions are based on a severity of security actions associated with the policies.

20. A method executed utilizing a computer including a tangible computer readable medium for prioritized network security, comprising:

identifying a set of policies, each policy having a condition associated therewith;

determining whether a user confirms activation of the policies;

determining whether the conditions are met; and activating the policies whose associated conditions are determined to be met if the user confirms the activation;

wherein the conditions are based on an urgency associated with an issue causing the policy to be activated;

wherein a first policy with a higher associated urgency has a first condition associated therewith that is different from a second condition associated with a second policy with a lower associated urgency such that the first policy and the second policy are activated under different urgency-related conditions;

wherein the activation of the policies includes:

adding the policies to a set of a plurality of active policies, and executing security actions associated with the active policies if associated limits are met; and identifying currently executed security actions, determining whether a conflict exists between the currently executed security actions, and resolving any conflicts between the currently executed security actions;

wherein the conditions are based on a time factor, the time factor including at least one of a timeframe, a predetermined time period, and a time limit;

wherein the conditions are based on a source of the policies;

wherein the conditions are based on a severity of security actions associated with the policies.

21. A method executed utilizing a computer including a tangible computer readable medium for providing network security, comprising:

identifying a set of a plurality of inactive policies each including a security action, a condition for activating the policy, and a limit for triggering the security action if the policy is active;

updating the set of inactive policies including:

receiving another inactive policy, determining whether a user accepts the inactive policy, and adding the inactive policy to the set if the user accepts the inactive policy;

determining whether the conditions are met for the inactive policies;

determining whether the user confirms the activation of the inactive policies if the associated conditions are met; and activating the inactive policies if the user confirms, the activation including:

adding the inactive policies to a set of a plurality of active policies, determining whether the conditions associated with the active policies are still met, de-activating the active policies if the associated conditions are not met, and executing the securing actions associated with the active policies if the associated conditions are met and the limits are met, the execution of the securing actions including:

identifying currently executed security actions, determining whether a conflict exists between the currently executed security actions, and resolving any conflicts between the currently executed security actions;

wherein the conditions are based on a time factor, the time factor including at least one of a timeframe, a predetermined time period, and a time limit;

wherein the conditions are based on a source of the policies;

wherein the conditions are based on a severity of security actions associated with the policies.

* * * * *

UNITED STATES PATENT AND TRADEMARK OFFICE
CERTIFICATE OF CORRECTION

PATENT NO. : 7,373,659 B1  Page 1 of 1
APPLICATION NO. : 10/028653
DATED : May 13, 2008
INVENTOR(S) : Vignoles et al.

It is certified that error appears in the above-identified patent and that said Letters Patent is hereby corrected as shown below:

In the claims:
col. 7, line 27 replace "securing" with --security--;
col. 8, line 17 replace "condition" with --conditions--.

Signed and Sealed this

Ninth Day of February, 2010

David J. Kappos
*Director of the United States Patent and Trademark Office*